United States Patent
Zsigmond et al.

(10) Patent No.: US 10,225,097 B2
(45) Date of Patent: *Mar. 5, 2019

(54) METHODS AND SYSTEMS FOR NETWORK CONFIGURATION

(71) Applicant: IKAN HOLDINGS LLC, New York, NY (US)

(72) Inventors: Fabio Zsigmond, Riverside, CT (US); Sion Elie Douer, New York, NY (US); Geraldo Yoshizawa, Sao Paulo (BR); Frederico Wagner, New York, NY (US)

(73) Assignee: IKAN HOLDINGS LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/982,687

(22) Filed: May 17, 2018

(65) Prior Publication Data

US 2018/0270077 A1    Sep. 20, 2018

Related U.S. Application Data

(63) Continuation of application No. 15/397,215, filed on Jan. 3, 2017, now Pat. No. 9,979,558, which is a (Continued)

(51) Int. Cl.
*G06K 7/10* (2006.01)
*G06K 17/00* (2006.01)
(Continued)

(52) U.S. Cl.
CPC .... *H04L 12/2807* (2013.01); *G06K 19/06028* (2013.01); *H04L 41/0806* (2013.01);
(Continued)

(58) Field of Classification Search
USPC ................. 235/375, 462.01, 462.15, 462.45, 235/472.01–472.03
See application file for complete search history.

(56) References Cited

U.S. PATENT DOCUMENTS

| 4,825,058 A | 4/1989 | Poland |
|---|---|---|
| 4,916,441 A | 4/1990 | Gombrich |

(Continued)

FOREIGN PATENT DOCUMENTS

DE    100 17 503 A1    10/2001

OTHER PUBLICATIONS

Supplementary European Search Report; Application No. 04713957.1; dated Sep. 3, 2008.

*Primary Examiner* — Tuyen K Vo
(74) *Attorney, Agent, or Firm* — Knobbe, Martens, Olson & Bear LLP

(57) ABSTRACT

Network and device configuration systems and methods are described. In an embodiment, a first user interface configured to receive from a user configuration information regarding a first network provided. Program code stored in computer accessible memory is configured to generate a barcode that includes information related to the first network configuration information, wherein the barcode can be scanned by a device having a barcode scanner and a network interface to configure the network interface to access the first network.

30 Claims, 10 Drawing Sheets

Related U.S. Application Data continuation of application No. 14/841,960, filed on Sep. 1, 2015, now Pat. No. 9,559,858, which is a continuation of application No. 14/505,166, filed on Oct. 2, 2014, now Pat. No. 9,143,401, which is a continuation of application No. 13/912,555, filed on Jun. 7, 2013, now Pat. No. 8,864,032, which is a continuation of application No. 13/303,577, filed on Nov. 23, 2011, now Pat. No. 8,464,953, which is a continuation of application No. 12/982,445, filed on Dec. 30, 2010, now Pat. No. 8,066,187, which is a continuation of application No. 11/934,573, filed on Nov. 2, 2007, now Pat. No. 7,861,933.

(60) Provisional application No. 60/856,993, filed on Nov. 6, 2006.

(51) Int. Cl.
*G06K 19/00* (2006.01)
*H04L 12/28* (2006.01)
*H04L 29/08* (2006.01)
*H04L 12/24* (2006.01)
*H04W 84/12* (2009.01)
*G06K 19/06* (2006.01)
*H04L 29/06* (2006.01)
*H04W 88/02* (2009.01)
*H04W 76/11* (2018.01)

(52) U.S. Cl.
CPC ...... *H04L 41/0886* (2013.01); *H04L 41/0889* (2013.01); *H04L 63/083* (2013.01); *H04L 67/04* (2013.01); *H04L 67/34* (2013.01); *H04W 76/11* (2018.02); *H04W 84/12* (2013.01); *H04W 88/02* (2013.01)

(56) References Cited

U.S. PATENT DOCUMENTS

| | | |
|---|---|---|
| 5,250,789 A | 10/1993 | Johnsen |
| 5,424,524 A | 6/1995 | Ruppert et al. |
| 5,465,291 A | 11/1995 | Barrus et al. |
| 5,488,223 A | 1/1996 | Austin et al. |
| 5,640,002 A | 6/1997 | Ruppert et al. |
| 5,664,110 A | 9/1997 | Green et al. |
| 5,748,899 A | 5/1998 | Aldrich |
| 5,777,315 A | 7/1998 | Wilz et al. |
| 5,837,986 A | 11/1998 | Barile et al. |
| 5,869,840 A | 2/1999 | Helton |
| 5,923,735 A | 7/1999 | Swartz et al. |
| 5,962,839 A | 10/1999 | Eskildsen |
| 5,971,277 A | 10/1999 | Cragun et al. |
| 5,979,762 A | 11/1999 | Bianco |
| 5,992,752 A | 11/1999 | Wilz et al. |
| 6,076,068 A | 6/2000 | OeLapa et al. |
| 6,149,063 A | 11/2000 | Reynolds |
| 6,321,989 B1 | 11/2001 | Wilz et al. |
| 6,347,743 B2 | 2/2002 | Wilz et al. |
| 6,434,530 B1 | 8/2002 | Sloane et al. |
| 6,435,407 B1 | 8/2002 | Fiordelisi |
| 6,459,863 B2 | 10/2002 | Kawabe |
| 6,565,005 B1 | 5/2003 | Wilz et al. |
| 6,609,197 B1 | 8/2003 | Ketcham |
| 6,622,919 B1 | 9/2003 | Wilz et al. |
| 6,640,214 B1 | 10/2003 | Nambudiri et al. |
| 6,688,522 B1 | 2/2004 | Philyaw et al. |
| 6,802,659 B2 | 10/2004 | Cremon et al. |
| 6,807,263 B2 | 10/2004 | Kible et al. |
| 6,857,013 B2 | 2/2005 | Ramberg et al. |
| 6,873,435 B1 | 3/2005 | Tehranchi et al. |
| 7,028,902 B2 | 4/2006 | Xu et al. |
| 7,080,777 B2 | 7/2006 | Wagner et al. |
| 7,086,592 B2 | 8/2006 | Wagner et al. |
| 7,165,721 B2 | 1/2007 | Wagner et al. |
| 7,281,655 B2 | 10/2007 | Wagner et al. |
| 7,303,124 B2 | 12/2007 | Wagner et al. |
| 7,306,153 B2 | 12/2007 | Chong et al. |
| 7,328,842 B2 | 2/2008 | Wagner et al. |
| 7,344,063 B2 | 3/2008 | Wagner et al. |
| 7,410,099 B2 | 8/2008 | Fukasawa et al. |
| 7,505,928 B2 | 3/2009 | Lebaschi |
| 7,558,838 B2 | 7/2009 | Philyaw |
| 7,681,792 B2 | 3/2010 | Wagner et al. |
| 7,861,933 B2 | 1/2011 | Zsigmond |
| 7,946,493 B2 | 5/2011 | Havens et al. |
| 8,041,951 B2 | 10/2011 | Want et al. |
| 2001/0046862 A1 | 11/2001 | Coppinger |
| 2002/0008145 A1 | 1/2002 | Walsh et al. |
| 2002/0143550 A1 | 10/2002 | Nakatsuyama |
| 2002/0161658 A1 | 10/2002 | Sussman |
| 2002/0185540 A1 | 12/2002 | Hashimoto et al. |
| 2003/0030841 A1 | 2/2003 | Parry |
| 2003/0034391 A1 | 2/2003 | Wagner et al. |
| 2003/0114176 A1 | 6/2003 | Phillips |
| 2004/0065739 A1 | 4/2004 | Xu et al. |
| 2004/0199545 A1 | 10/2004 | Wagner et al. |
| 2004/0206821 A1 | 10/2004 | Longacre |
| 2005/0011958 A1 | 1/2005 | Fukasawa et al. |
| 2005/0086328 A1 | 4/2005 | Landram et al. |
| 2005/0182652 A1 | 8/2005 | McIntyre et al. |
| 2005/0260973 A1 | 11/2005 | van de Groenendaal |
| 2006/0000910 A1 | 1/2006 | Chong et al. |
| 2006/0106623 A1 | 5/2006 | Lebaschi |
| 2006/0221915 A1 | 10/2006 | Gatta |
| 2007/0008925 A1 | 1/2007 | Dravida et al. |
| 2007/0010248 A1 | 1/2007 | Dravida et al. |
| 2007/0027964 A1 | 2/2007 | Herrod |
| 2008/0056722 A1 | 3/2008 | Hendrix |
| 2008/0086414 A1 | 4/2008 | Ching |
| 2008/0133264 A1 | 6/2008 | Wagner et al. |
| 2009/0147700 A1 | 6/2009 | Sewall |
| 2010/0048242 A1 | 2/2010 | Rhoads et al. |
| 2013/0107748 A1 | 5/2013 | Dravida et al. |
| 2013/0185403 A1 | 7/2013 | Vachharajani et al. |
| 2013/0206832 A1* | 8/2013 | Hashimoto ....... G06F 17/30244 235/375 |
| 2014/0050319 A1 | 2/2014 | Pang et al. |
| 2014/0071942 A1 | 3/2014 | Ye |
| 2014/0214628 A1 | 7/2014 | Argue et al. |
| 2015/0379607 A1 | 12/2015 | Pedley et al. |
| 2016/0267565 A1 | 9/2016 | Katcher |
| 2017/0293965 A1 | 10/2017 | Sasaki et al. |
| 2018/0005631 A1 | 1/2018 | Lee et al. |

* cited by examiner

IKan ecommerce website header

Registration Progress your account information | your retailer preferences | your email preferences | your delivery preferences | your home network settings | confirm your settings To simplify the ssetup of you IKan onto you home network, please enter your home network settings below and click the "save & continue registration" button below.

Once you have completed your registration you will have the option of printing your home network settings in barcode format. The barcodes containing you home wireless network settings are then scanned into you IKan to automatically configure your IKan for your home network.

This is much easier than entering your home network settings manuall into your IKan. We highly recommend you perform this step. To skip this step, click the "No Thanks, skip this step" button below.

Network Name & Security

Network Name [        ]
Security Level [drop down box]
Password [        ]  *only appears if security level is not "none"*

Network Address

○ Automatically obtain network address (DHCP)
⊗ Enter network address manually

IP Address [ ][ ][ ][ ]  *only appears if "manual" selected*
Subnet Mask [ ][ ][ ][ ]  *only appears if "manual" selected*
Router Address [ ][ ][ ][ ]  *only appears if "manual" selected*
Primary DNS [ ][ ][ ][ ]  *only appears if "manual" selected*
Secondary DNS [ ][ ][ ][ ]  *only appears if "manual" selected*

Proxy Setting

○ I do not use a proxy
⊗ I have a proxy

Proxy Name [        ]  *only appears if have proxy*
Port Number [        ]  *only appears if have proxy (8080 default)*

( save & continue registration )    ( No Thanks, skip this step )

*FIG. 2A*

IKan ecommerce website header

Your registration is complete!

A registration confirmation email has been sent to billadam@mac.com

To easily connect your IKan to your home network, click on the "print home network settings" button below to print your home network settings you entered during registration. Your network settings will print as barcode. During IKan setup you will be asked to scan the barcodes to configure your IKan settings.

( Print home network settings )

*FIG. 2B*

Please scan all barcodes printed when prompted on your IKan unit display

B1      z

A1Kramer   z

L1kramersz

L2network   z

Your home network settings:

Network Name: Kramer
Security: WEP
Password: kramersnetwork

Code 128 barcode Format

A1Kramer z

| Position 1, variable to assign | Value |
|---|---|
| -network name | A |
| -security level | B,C,D,E |
| -security password | L |
| -IP address | M |
| -subnet mask | N |
| -router | O |
| -DNS primary | P |
| -DNS secondary | Q |
| -Proxy Name | R |
| -Proxy port number | S |

Position 2, data sequence          Values   1,2,3

Position 3-11, customer entered data

Position 12, calculated check digit

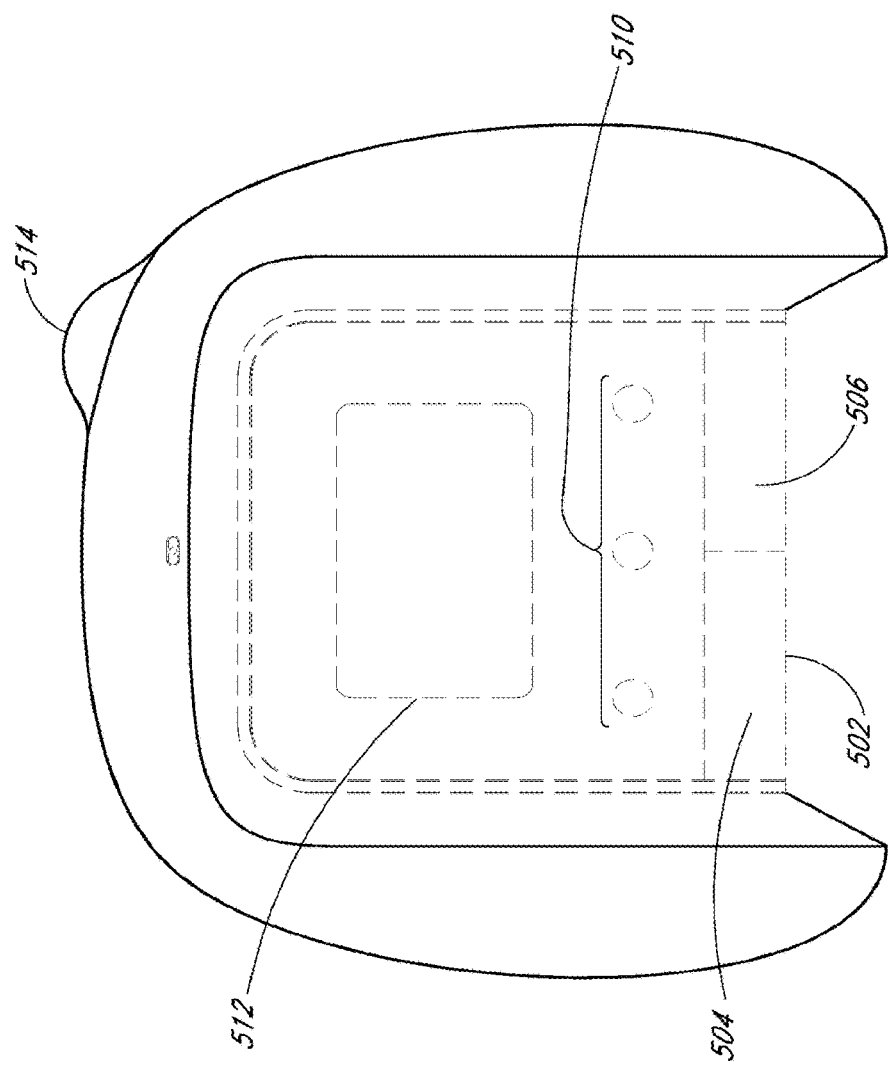

METHODS AND SYSTEMS FOR NETWORK CONFIGURATION

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

STATEMENT REGARDING FEDERALLY SPONSORED R&D

Not applicable.

PARTIES OF JOINT RESEARCH AGREEMENT

Not applicable.

REFERENCE TO SEQUENCE LISTING, TABLE, OR COMPUTER PROGRAM LISTING

Not applicable.

BACKGROUND OF THE INVENTION

Field of the Invention

The present invention is related to electronic devices, and in particular, to methods and systems for configuring electronic devices.

Description of the Related Art

With the rapid increase in networkable consumer electronic systems, such as Internet radios, televisions with computer interfaces, and the like, there has been a rapid increase in consumer frustration regarding the configuration of such electronic systems so as to be able to access a network, such as the Internet.

For example, a conventional network configuration process (wherein the target network is the Internet), may involve accessing a network configuration user interface, entering the name of an Internet Service provider, specifying a network connection-type, specifying whether the connection is to be made via a broadband connection that needs a user name and password, via an "always-on" broadband connection that does not require a sign-in, or via a connection is to be made using a dial-up modem, specifying security related information, etc. Such a conventional process is difficult to perform on electronic devices having small screens not capable of displaying extensive user interfaces and/or having limited keyboards (e.g., that do not have an alphanumeric keyboard).

SUMMARY OF THE INVENTION

Example embodiments are described that enable configuration of device settings, such as a network interface, using a printed visual code read or accessed by the device.

An example embodiment provides a network configuration system, comprising a first user interface configured to receive from a user configuration information regarding a first network. The system further includes program code stored in computer readable memory configured to generate a barcode that includes information related to the first network configuration, where the barcode can be scanned by a device that has a barcode scanner that converts the barcode into digital data and the device uses at least a portion of the data to configure a network interface to access the first network.

An example embodiment provides a configuration system, comprising: a first user interface configured to receive from a user configuration information regarding a first device associated with the user; and program code stored in computer accessible memory configured to generate a visual code that includes information related to the first device configuration information, wherein the visual code can be read by the first device to configure, at least in part, the first device.

An example embodiment provides a method of providing network configuration information, comprising: causing at least in part a first user interface to be displayed to a user on a user terminal, the first user interface including fields for receiving configuration information for a first electronic device network interface; causing at least in part information provided by the user via the first user interface to be encoded in computer readable optical code, wherein the optical code can be read by the first electronic device using an optical image capture device; and causing at least in part the optical code to be displayed and/or printed via the user terminal, wherein the optical code is configured to be scanned to obtain the network interface configuration information.

An example embodiment provides a configurable system, comprising: a processor; memory coupled to the processor; a computer program stored in the memory that is executable by the processor; a network interface; and an optical reader, wherein the computer program is configured to utilize information read by the optical reader to configure network settings.

An example embodiment provides a method of configuring a system, comprising: causing, at least in part, an optical code to be read by the system using an optical reader that converts image information to digital data; and causing, at least in part, the digital data to be used to configure the operation of at least a network connection.

An example embodiment provides a method of configuring an electronic device, comprising: using an optical reader to read a visual code to obtain data encoded therein; and configuring a network connection of the electronic device using at least a portion of the data.

BRIEF DESCRIPTION OF THE DRAWINGS

Embodiments of the present invention will now be described with reference to the drawings summarized below. These drawings and the associated description are provided to illustrate example embodiments of the invention, and not to limit the scope of the invention.

FIGS. 2A-C illustrate example user interfaces for receiving device settings.

FIG. 5 illustrates an example configurable electronic system.

DETAILED DESCRIPTION OF PREFERRED EMBODIMENTS

Figure 1:
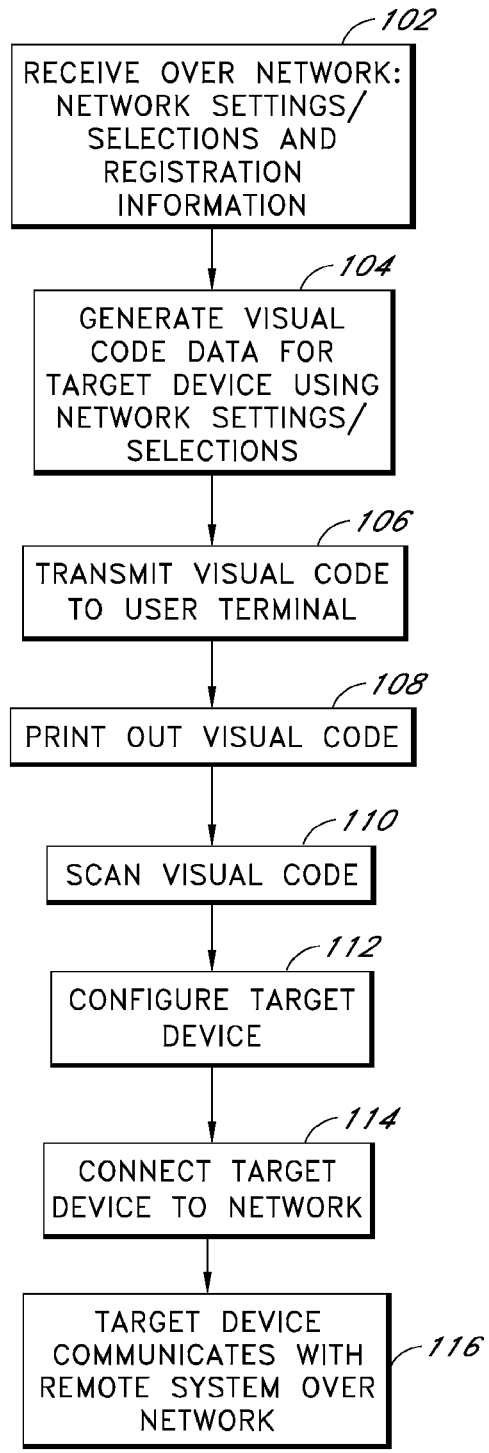
FIG. 1 illustrates an example configuration flow chart.

Example systems and methods are described herein for configuring network settings on a device based on the characteristics of an available network and/or for setting user preferences for the device. Certain embodiments utilize visual indicia read by an optical reader to perform network configuration and/or to set user preferences for an electronic device.

As discussed above, certain conventional approaches for configuring an electronic device to access a network are overly complex for a typical consumer. Further, many conventional approaches rely on the device having a relatively large and expensive screen for displaying complex and detailed user interface, and having a relatively large keyboard (e.g., an alphanumeric keyboard) for entering in network configuration data. It would be advantageous to make it easier for a consumer to configure a consumer electronic device and to reduce the hardware requirements of the electronic device.

As discussed below, certain embodiments encode network configuration information and/or user preferences for an electronic device in an optical/visual code (e.g., a barcode) and utilize an optical reader, such as a barcode scanner, coupled to the electronic device to read the optical code. The electronic device then performs the network configuration and/or configures other device settings in accordance with the user preferences.

Throughout the following description, the term "Web site" is used to refer to a user-accessible network site that implements the basic World Wide Web standards for the coding and transmission of hypertextual documents. These standards currently include HTML (the Hypertext Markup Language), HTTP (the Hypertext Transfer Protocol), Java, and XML. It should be understood that the term "site" is not intended to imply a single geographic location, as a Web or other network site can, for example, comprise multiple geographically distributed computer systems that are appropriately linked together.

Furthermore, while the following description relates to an embodiment utilizing the Internet and related protocols, other networks and other protocols may be used as well. In addition, unless otherwise indicated, the functions described herein may be performed by executable code and instructions running on one or more general-purpose computers. For example, program code stored in non-volatile and/or volatile memory can include one or more instructions, which can optionally be straight-line code and/or organized as modules or objects configured to receive and process inputs, provide outputs, and to selectively store data. However, the present invention can also be implemented using special purpose computers, state machines, and/or hardwired electronic circuits. While certain example processes are described herein, not all the process states need to be performed, and the order of the process can be varied.

While certain example embodiments are described with reference to barcodes (e.g., linear barcodes, stacked barcodes, matrix barcodes, etc.) and barcode scanners, other computer readable indicia (e.g., dots, concentric circles, text codes hidden within images, text readable using optical character recognition systems, etc.) and scanners/image capture devices can be used. For example, a scanner/image capture device can be a laser scanner (e.g., including light source, a lens and a photo conductor translating optical impulses into electrical ones), a still frame camera, a video capture device, etc. While certain types of networks may be referred to (e.g., an IEEE 802.11 wireless network) other networks may be utilized (e.g., cellular networks, IEEE 802.16 networks, etc.). While the illustrated user interfaces may user certain language and provide certain user instructions, other language and instructions may be used.

In an example embodiment, a networked user terminal (e.g., a personal computer, an interactive television, a smart phone, a personal digital assistant, a networked-enabled digital music/video player, etc.) scans for existing wireless networks (or otherwise accesses information regarding local networks) and displays (e.g., via a computer system display) a listing of available networks (e.g., one or more IEEE 802.11 wireless networks) to the user. By way of example, a WiFi scanner can be used to discover wireless nodes (e.g., access point and wireless clients). The user chooses (e.g., by clicking on a network entry in the network listing) which network the user wants to configure a second device to access. By way of example, the second device has a barcode or other optical scanner. By way of further example, the second device can be a processor-based terminal, including a display, a keyboard, memory, a wired and/or wireless network interface, and a scanner/camera.

Optionally, the second device can be configured to be used to scan product information, such as that encoded in barcodes on household or business consumable items, such as food packaging. By way of further example, the second device can be a kitchen appliance (e.g., an oven, refrigerator, blender, television, computer, a waste receptacle, etc.) including or coupled to an optical scanner and including a network interface.

A user interface is provided that enables a user to input/select certain network information (e.g., what network the second device is to use, what is the security method being used, such as WEP, a network password, a network address, a proxy setting, etc.). Some or all of the information may be prepopulated based on information stored on or accessed by the computer system. The user interface may be provided by an application stored on the user's computer system or may be accessed over a network from a remote server (e.g., over the Internet, wherein the user interface is provided as a Web page or pages by a Web page server).

Additionally, a user interface is optionally provided via which a user can input device preferences, such as energy management settings (e.g., when or after what period of non-use the second device is to power down or enter a lower power consumption mode, such as by turning off the second device display until the user presses a button or otherwise uses the second device), display brightness, display contrast, and/or other preferences. The input/selected information can be stored locally in memory on the user computer system and/or remotely or a remote computer system (e.g., the computer system that provided the user interface).

Based on the selected/input information (e.g., configuration settings and/or preferences), the barcode generation application generates barcodes or other computer readable indicia/codes which can be printed (e.g., by a printer connected to the user computer system) in response to a user instruction or otherwise. The printed barcode(s) are then placed beneath or otherwise positioned with respect to the second device scanner, which then scans the code. The second device then configures its network setting and/or preference settings in accordance with the scanned code.

FIG. 1 illustrates an example configuration process for a target electronic device, (e.g., the scanning system described in U.S. Pat. No. 7,165,721, incorporated herein by reference, or other electronic device). The target device optionally has a relatively small display (e.g., less than 10 inches diagonal), and may have a relatively small keyboard (e.g., 9 keys or less, 5 keys or less, etc.). Optionally instead, the target device has a relatively large display and a relatively large keyboard. At state 102, a user accesses a website hosted by a remote system (e.g., an electronic commerce system, such as one that tracks user consumption of items and processes item orders received over a network or otherwise) via a terminal (e.g., a personal computer) coupled to a Website. The terminal may be equipped with a relatively large display (e.g., 10 inches or more diagonally) and may be further equipped with an alphanumeric keyboard.

The user then proceeds to register to create an account (or if the user already has an account, the user can log in to edit/modify account information). For example, the user may be asked to provide a user name, contact information (e.g., email, physical address, phone number, etc.), identification information regarding the device to be configured (e.g., a part number and/or a serial number), payment information (e.g., a credit card number, a debit card number, etc.), and/or other information. In addition, the user may be asked to provide user preference information.

For example, if the target electronic device is intended to collect information regarding items consumed by the user and to generate shopping lists for replacement items, the user may be asked to specify user preferences related to how often to reorder items, who orders are to be placed with (e.g., which retailer/supermarket), how items are to be delivered, when items are to be delivered, what types of status notifications are to be automatically provided to the user, etc. Other example user preferences are described in U.S. Pat. No. 7,165,721.

Optionally, a user interface is provided via which the user can specify device settings. For example, the user can specify when (e.g., how long after the last use of the device) the device should enter a low power consumption mode (e.g., turn off display backlighting, let device hard drive spin down, turn off network radio, etc.). The information provided by the user at state 102 is stored in a user database or other data store.

In addition, a user is requested to provide/select network settings via a network configuration user interface. For example, the user may be asked to provide (by typing in, selecting from a menu, or otherwise) some or all of the following and/or other information:

Network name;
Network security level;
Password (if the security level necessitates a password);
Network address (e.g., IP address, subnet mask, router, DNS primary, DNS secondary, or an indication that the system is to automatically obtain the network address);
Proxy name and port number (if a proxy is being used).

When the user has provided the network configuration data, the user can select a "save" control and the data is stored locally on the user terminal and/or in the user database.

At state 104, the remote system (or the terminal) encodes the network configuration information using a barcode generator and preferences related to the electronic device into an optical code (e.g., a barcode). For example, the network name, security level, password, IP address, subnet mask, router, DNS, Proxy name, proxy port number can be encoded into a barcode, as illustrated in FIG. 3D.

Optionally, the system can encode other types of information into the barcode and/or additional barcodes. For example, the system can encode a Uniform Resource Locator (URL) or other locator which the device is to access and obtain information or programs. For example, the URL can access a Web site via which a new version of an operating system or program for the device can be downloaded to and installed by the device. By way of further example, the URL can access a site via which an item catalog or catalog data (or other database) can be downloaded.

At state 106, the remote system transmits the optical code in digital form (e.g., as a digital image or as data that can be converted by the terminal into an image) over the network to the user terminal. At state 108, the user prints out the optical code using a printer (e.g., a laser printer, an ink jet printer, a thermal printer, a sublimation printer, etc.) coupled to the user terminal (optionally, the user can scan the code directly from the terminal display without printing out the optical code).

At state 110, the user scans the optical code (e.g., from the printed hardcopy version or from the terminal display) using an optical scanner coupled to the electronic device. The scanner translates the optical code to digital data which is then stored in device memory. The digital data is provided/accessed by a corresponding program hosted on the device. The corresponding program then utilizes the digital data appropriately. For example, at state 112, a network configuration program accesses the network configuration portion of the data and configures the network interface accordingly. At state 114, the device connects to a network. At state 116, the device communicates with the system.

Certain example user interfaces with now be described with reference to FIGS. 2AC. FIG. 2A illustrates an example user interface that can be utilized by a user to provide network configuration information to the system. The user interface display instructions for the user regarding providing network settings via the user interface. Corresponding fields are provided to receive the network settings. In this example, the following fields are provided (although other fields can be provided as well):

Network name;
Security level;
Password;
Automatically obtain network address check box (to instruct the device to automatically obtain the network address using, in this example, Dynamic Host Configuration Protocol);
Manually enter network address checkbox (to enable the user to enter network address information);
Fields for receiving manually entered network address information (IP address field, Subnet Mask field, Router address, Primary DNS, Secondary DNS);
Proxy name field;
Proxy port address.
A control is provided via which the user can instruct the system to save the network configuration system information;
A control is provided via which the user can skip entering data via the illustrated user interface (e.g., when the user would rather perform network configuration directly on the target device).

FIG. 2B illustrates a user interface presented once the user has completed the registration process. The user interface further instructs the user to print out the barcodes corresponding to the network settings and to scan the barcodes via the target device.

Figure 2C:
Figure 2C:
Figure 2C:
Figure 2C:

FIG. 2C illustrates an example print out of the barcodes corresponding to the network configuration data. In addition to barcode data, human readable text is provided including, in this example, the network name, security level, and password specified by the user. Other user provided data can be textually provided as well. Instructions on the use of he barcode are also provided.

Figure 3A:
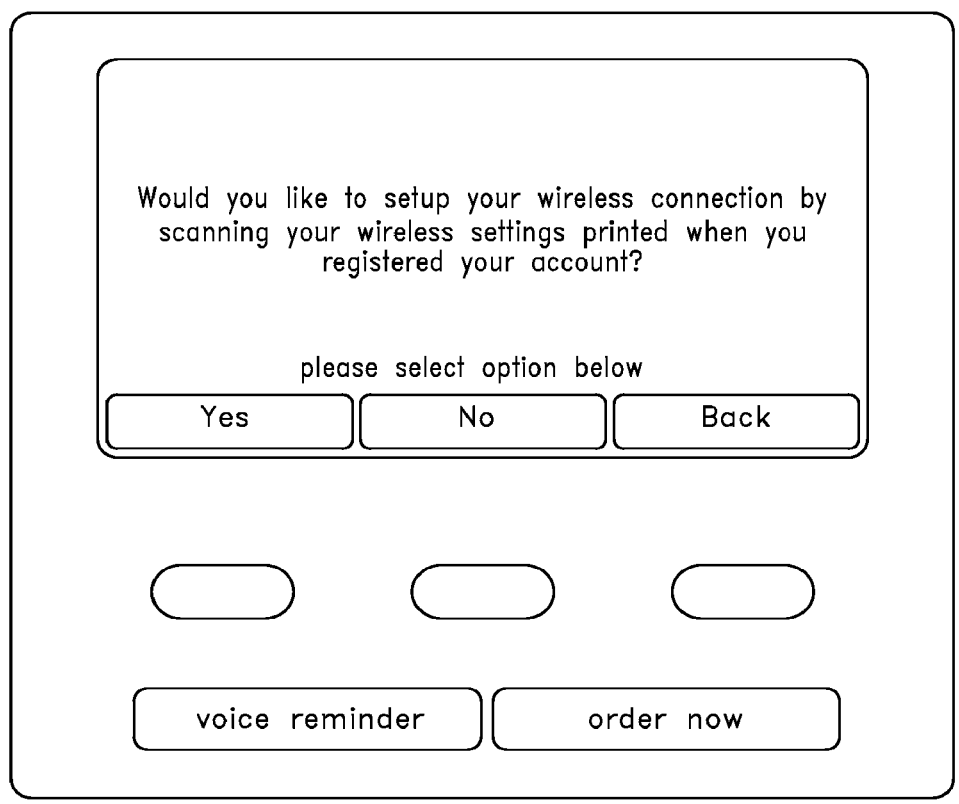
FIGS. 3A-C illustrate example user interfaces displayed by a device being configured.
Figure 3B:
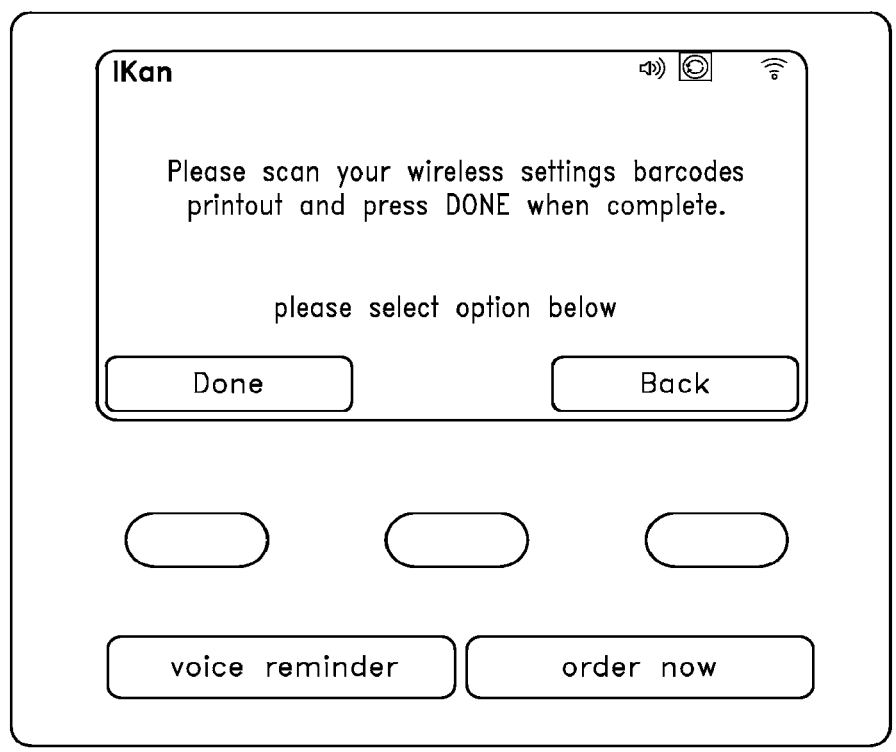
Figure 3C:
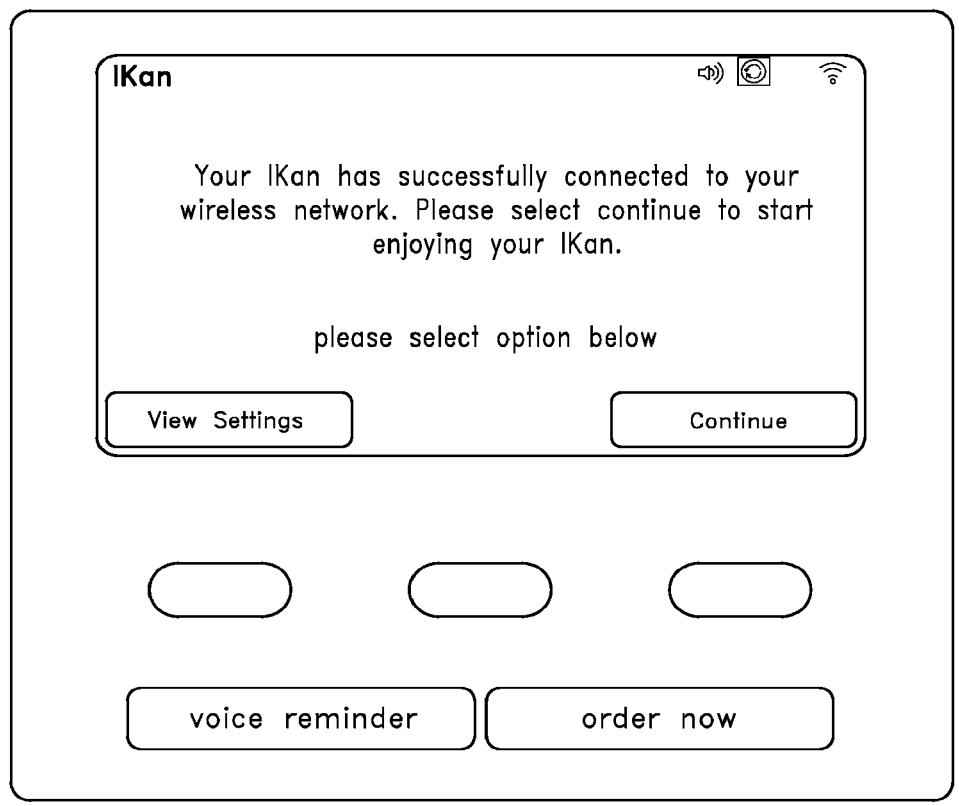
Figure 3D:
FIG. 3D illustrates an example optical code format.

FIGS. 3A-C illustrate example user interfaces for adding the target device to the user's network that are presented on an example target device display. In this example, the device includes three buttons whose functions may change and whose current functions are described by text/labels presented via the device display. In addition two buttons of fixed function with fixed labels are provided (a voice reminder/memo button to initiate recording of a voice memo/shopping list, and "order now" button to cause a substantially immediate order to be placed for a pending shopping list).

Referring to FIG. 3A, the example user interface asks the user if the user would like to setup a wireless network connection by having the device scan the printed wireless settings. The programmable buttons function respectively as a "yes" input, a "no" input, and a "back" button (to return to a previous menu). If the user activates the "yes" button, the example menu illustrated in FIG. 3B is presented. The user interface instructs the user to scan the wireless network setting barcodes printout and to press the "done" control when complete. One of the buttons is labeled "done" and another button is labeled "back".

If the user activates the "done" button, once the device configures the network interface and successfully connects to a local network in accordance with the settings specified in the barcode, the example user interface displayed in FIG. 3C is presented on the device. The illustrated user interface informs the user that the device has successfully connected to the user's network and instructs the user to activate a control to begin using the networked device.

FIG. 3D illustrates an example barcode in code 128 barcode format and the relative position of the network setting information and of a calculated check digit. Code 128 is a linear symbology that encodes numbers, text functions and the 128 ASCII character set (from ASCII 0 to ASCII 128). A Code 128 barcode includes the following sections:
Quiet Zone;
Start Character;
Encoded Data;
Check Character;
Stop Character;
Quiet Zone.

The check character is calculated from a modulo 103 calculation of the weighted sum of all the characters.

Of course other barcode types can be used, including, without limitation: UPC, Code 25, Code 39, Code 93, Code 11, ITF-14, Codablock, Code 16K, PDF417, Aztec Code, bCode, Code 16K, PDF417, etc.

Figure 4:
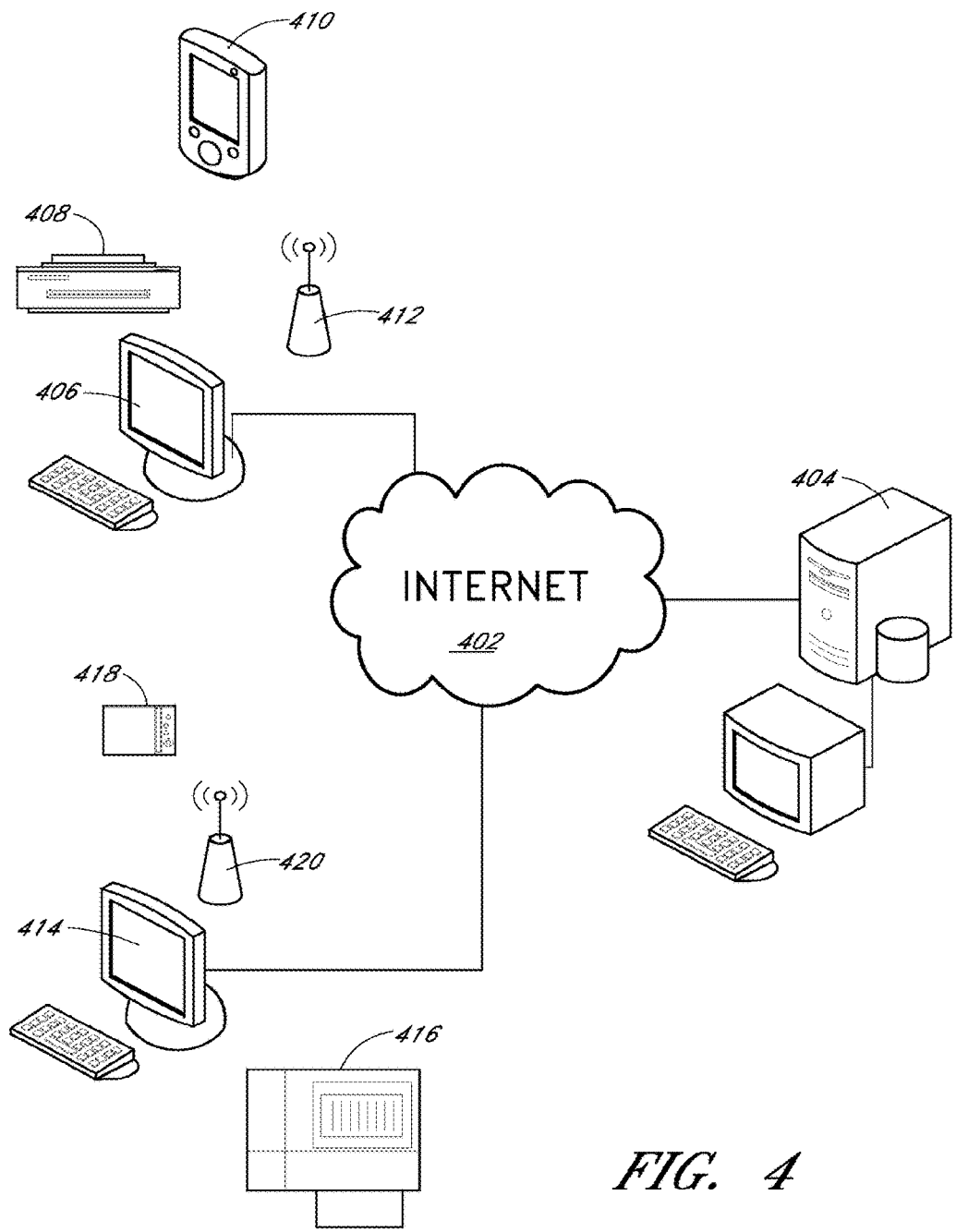
FIG. 4 illustrates an example networked system.

FIG. 4 illustrates an example networked configuration. In this example, a system 404, which may host an online commerce website (e.g., a shopping website) is coupled to a network 402 (the Internet in this example). The system 404 includes a Web server that hosts user interfaces for providing network settings, such as those described above with reference to FIGS. 2A-C. In addition, the system 404 in this example hosts a barcode generator that converts data provided by the user via the user interfaces (and optionally other data as well, such as Uniform Resource Locaters) into barcodes. The system can include a user database storing user registration information (e.g., user contact information, payment information, etc.), user preferences, target device identifiers, user specified network settings, barcode information, order histories, pending orders, electronic catalogs including item information (e.g., name, cost, type, etc.), and/or other information.

User terminals 406, 414 (in this example, personal computers associated with two different users and located in different locations), access the system 404 via the Internet 402. The terminals 406, 414 in this example include full keyboards (including a key for each letter and for the numbers 0-9, and well as keys for certain punctuations), displays, local memory (e.g., a hard disk drive and/or FLASH memory, RAM, etc.), and network interfaces (e.g., wired and/or wireless network interfaces). As similarly discussed above, the terminals 406, 414 can be used to access user interfaces, enter data, and receive communications provided by the system 404. The terminals 406, 414 may be equipped with browsers to access Web sites. For example, the terminals can display a barcode generated by the system 404 and provided via a webpage or via email. The terminals 406, 414 are connected to corresponding printers 408, 416, which can be used to print the barcodes.

Wireless network access points 412, 420 provide wireless the target devices access to an Internet connection.

Target devices 410 (a touch screen portable personal digital assistant in this example) and 418 (a video game system in this example) include or are coupled to optical scanners which can be used to scan the barcodes, as discussed above.

FIG. 5 illustrates another example target device. The device includes an integral barcode scanner 502, dedicated buttons 504, 506 (such as the fixed function buttons discussed above with respect to FIGS. 3A-C), programmable function buttons (such as the changeable function buttons discussed above with respect to FIGS. 3A-C), a display 512, and an antenna 514. The device may include a processor, memory (e.g., a magnetic disk, FLASH memory, and/or RAM), a wired and/or wireless network interface, and an interface to removable memory. The processor may be coupled to the memory, network interface(s), display, and buttons. The device memory may store programs, user interfaces and data, such as a product database. A program may be use optically read data (after being converted to digital data) to implement corresponding device settings (e.g., network settings, display settings, energy conservation settings).

Thus, described above are efficient methods and systems for performing device configuration, including network configuration, even when certain user interface devices (e.g., a large screen, a full keyboard) are lacking.

It should be understood that certain variations and modifications of this invention would suggest themselves to one of ordinary skill in the art. The scope of the present invention is not to be limited by the illustrations or the foregoing descriptions thereof.

What is claimed is:

1. A configurable computing system, comprising:
a computer device;
a network antenna;
an IEEE 802.11 network interface;
a camera;
and non-transitory computer readable memory having program instructions stored thereon that when executed by the computing device cause the system to at least:
read a barcode using the camera, the barcode comprising an encoded IEEE 802.11 network password;
cause the read barcode to be translated to obtain data comprising the IEEE 802.11 network password;
use the obtained IEEE 802.11 network password to enable the configurable computing system to access a local IEEE 802.11 wireless network using the IEEE 802.11 network interface without a user having to manually key in an IEEE 802.11 network password for the local IEEE 802.11 wireless network on the configurable computing system.

2. The configurable computing system as defined in claim 1, further comprising a touch screen, a personal digital assistant, a video capture device, and a light source, wherein the instructions, when executed by the computing device, are configured to enable the user to generate a list using voice, and to translate the barcode to obtain a network identifier, and utilize the obtained IEEE 802.11 network identifier in enabling access to the local IEEE 802.11 network.

3. The configurable computing system as defined in claim 1, wherein the instructions, when executed by the computing device, are configured to translate the barcode to obtain a network identifier, and utilize the obtained IEEE 802.11 network identifier in enabling access to the local IEEE 802.11 network.

4. The configurable computing system as defined in claim 1, wherein the configurable computing system has a display less than ten inches diagonal and has fewer than ten physical keys.

5. The configurable computing system as defined in claim 1, wherein the configurable computing system comprises an oven, refrigerator, blender, television, a video game system, or a waste receptacle.

6. The configurable computing system as defined in claim 1, wherein the configurable computing system camera is configured to read a barcode displayed by an electronic device.

7. The configurable computing system as defined in claim 1, wherein the configurable computing system camera is configured to read a barcode printed by a printer.

8. The configurable computing system as defined in claim 1, wherein the configurable computing system is configured to access operational information, in addition to an IEEE 802.11 network password, using the read barcode.

9. The configurable computing system as defined in claim 1, wherein the camera comprises a lens and is configured to translate optical impulses into electrical signals.

10. The configurable computing system as defined in claim 1, wherein the configurable computing system comprises at least one user configurable button and a touch screen.

11. The configurable computing system as defined in claim 1, wherein the barcode comprises a quiet zone and a check character, wherein the check character is a calculated value based on other characters encoded in the barcode.

12. The configurable computing system as defined in claim 1, wherein the configurable computing system comprises a light source.

13. The configurable computing system as defined in claim 1, wherein the configurable computing system comprises a personal digital assistant.

14. The configurable computing system as defined in claim 1, wherein the configurable computing system is configured to enable the user to generate a list using voice.

15. A computer-implemented method, the method comprising:
reading using a camera, by a configurable computing system, a barcode or other computer readable visual indicia, the configurable computing system comprising computer hardware including the camera, a processor and an IEEE 802.11 network interface, the configurable computing system configured with specific executable instructions;
utilizing, by the configurable computing system, the read barcode or other computer readable visual indicia to obtain an IEEE 802.11 wireless network password of an IEEE 802.11 network; and
using, by the configurable computing system, the IEEE 802.11 wireless network password to access a local IEEE 802.11 wireless network without a user having to manually key in the IEEE 802.11 wireless network password on the configurable computing system, wherein the IEEE 802.11 wireless network password is used to enable the configurable computing system to communicate over the local IEEE 802.11 wireless network via the IEEE 802.11 network interface.

16. The computer-implemented method as defined in claim 15, the method further comprising:
utilizing, by the configurable computing system, the read barcode or other computer readable visual indicia to obtain a network identifier,
wherein using, by the configurable computing system, the IEEE 802.11 wireless network password to access the local IEEE 802.11 wireless network further comprises using the network identifier to access the local IEEE 802.11 network.

17. The computer-implemented method as defined in claim 15, wherein reading, using the camera, the barcode or other computer readable visual indicia further comprises reading the barcode or other computer readable visual indicia from a display of an electronic device.

18. The computer-implemented method as defined in claim 15, wherein reading, by the configurable computing system, the barcode or other computer readable visual indicia further comprises reading, by the configurable computing system, a barcode printed by a printer.

19. The computer-implemented method as defined in claim 15, wherein the barcode or other computer readable visual indicia comprises a barcode having a quiet zone and a check character, wherein the check character is a calculated value based on other characters encoded in the barcode.

20. The computer-implemented method as defined in claim 15, wherein the configurable computing system comprises a home appliance.

21. The computer-implemented method as defined in claim 15, wherein reading a barcode or other computer readable visual indicia comprises reading a barcode.

22. The computer-implemented method as defined in claim 15, wherein the configurable computing system comprises a touch screen, a light source, and an antenna.

23. The computer-implemented method as defined in claim 15, the method further comprising enabling the user to record a voice memo using the configurable computing system.

24. The computer-implemented method as defined in claim 15, the method further comprising enabling the user to generate a shopping list using a voice input via the configurable computing system.

25. A non-transitory storage medium, said non-transitory storage medium having stored thereon executable program instructions that when executed by a computer system are configured to cause the computer system to perform operations comprising:
read a barcode or other computer readable visual indicia;
cause translation of the read barcode or other computer readable visual indicia to obtain a password of an IEEE 802.11 network;
utilize the IEEE 802.11 network password obtained by translation of the read barcode or other computer readable visual indicia to enable the computer system to access the IEEE 802.11 wireless network using an IEEE 802.11 network interface of the computer system without a user having to manually key in the IEEE 802.11 network password on the computer system; and
enable the computer system to communicate over the IEEE 802.11 wireless network.

26. The non-transitory storage medium as defined in claim 25, wherein:
the computer readable visual indicia is not a barcode, and wherein reading the computer readable visual indicia further comprises reading computer readable visual indicia from an electronic device display.

27. The non-transitory storage medium as defined in claim 25, wherein:
the computer readable visual indicia is a barcode.

28. The non-transitory storage medium as defined in claim 25, wherein the computer system comprises a home appliance.

29. The non-transitory storage medium as defined in claim 25, wherein the executable program instructions direct the computer system to enable the user to record a voice memo using the configurable computing system.

30. The non-transitory storage medium as defined in claim 25, wherein the executable program instructions direct the computer system to enable the user to generate a list using a voice input.

* * * * *